United States Patent
Rieck et al.

(10) Patent No.: US 7,187,273 B2
(45) Date of Patent: Mar. 6, 2007

(54) SYSTEM FOR DETERMINING A CHANGE IN VEHICLE TIRE PRESSURE

(75) Inventors: Michael Rieck, Hamburg (DE); Joachim Wietzke, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 243 days.

(21) Appl. No.: 10/841,078

(22) Filed: May 7, 2004

(65) Prior Publication Data

US 2005/0030170 A1    Feb. 10, 2005

(30) Foreign Application Priority Data

May 9, 2003    (EP)    ................... 03009787

(51) Int. Cl.
*B60C 23/00*    (2006.01)

(52) U.S. Cl. .................... 340/443; 340/445; 701/29

(58) Field of Classification Search ................ 340/443, 340/442, 445, 447; 701/29, 207
See application file for complete search history.

(56) References Cited

U.S. PATENT DOCUMENTS

| | | | |
|---|---|---|---|
| 5,774,824 A | | 6/1998 | Streit et al. |
| 5,796,613 A | * | 8/1998 | Kato et al. ............... 701/214 |
| 5,847,645 A | | 12/1998 | Boesch |
| 5,939,626 A | * | 8/1999 | Tominaga et al. ......... 340/444 |
| 6,002,327 A | * | 12/1999 | Boesch et al. ............ 340/443 |
| 6,313,742 B1 | | 11/2001 | Larson |
| 6,404,330 B1 | * | 6/2002 | Sugisawa .................. 340/444 |
| 6,904,383 B2 | * | 6/2005 | Tanaka et al. ............. 702/169 |

FOREIGN PATENT DOCUMENTS

| | | |
|---|---|---|
| DE | 198 21 582 A1 | 12/1998 |
| EP | 1 336 513 A1 | 2/2003 |
| JP | 10-297228 | 11/1998 |
| JP | 2002-362117 | 12/2002 |

* cited by examiner

*Primary Examiner*—Thomas Mullen
(74) *Attorney, Agent, or Firm*—Brinks Hofer Gilson & Lione

(57) ABSTRACT

A tire pressure diagnostic system for vehicles is provided for diagnosing tire pressure for at least one of the tires based on the traveled distance of the vehicle and input indicative of the tire movement. The diagnosis of the tire pressure may be based on comparing the traveled distance of the vehicle with a distance determined based on the output from a tire sensor and a predetermined radius of the tire under proper inflation. The diagnosis of the tire pressure may also be based on comparing an actual radius of the tire, determined by the traveled distance of the vehicle, with a predetermined radius of the tire under proper inflation. The diagnosis of the tire pressure may further be based on comparing the number of wheel rotations, determined from the tire movement input, with a number of rotations determined based on the traveled distance and the predetermined radius of the tire under proper inflation.

36 Claims, 6 Drawing Sheets

SYSTEM FOR DETERMINING A CHANGE IN VEHICLE TIRE PRESSURE

PRIORITY CLAIM

This application claims the benefit of European Patent Application No. EP 03009787.7, filed May 9, 2003, which is hereby incorporated by reference herein in its entirety.

BACKGROUND OF THE INVENTION

1. Technical Field

This application relates to tire pressure diagnostic systems for vehicles. In particular, the application relates to a tire pressure diagnostic system for vehicles for determining a change in the inflation pressure of a vehicle tire using wheel rotation signals in combination with a plurality of vehicle position inputs.

2. Related Art

Low tire detection systems that monitor tire pressure and profile height of the tire are known. The apparatus required for such systems generally includes a sensor and a complicated wiring harness for each tire. For trucks and other large vehicles, which may include up to 18 or more tires, the wire harness structure is even more complicated and raises the cost of the vehicle.

Systems are also known that use effective rolling radius calculations to determine when the radius of a tire changes. For example, a tire that is flat or has low pressure has an incrementally smaller effective rolling radius than an adequately inflated tire. In such systems, wheel displacement sensors may be used to measure the angular displacement of each wheel by means of a rotation detector. For example, if a vehicle is traveling at velocity v, the vehicle tire will rotate with an angular speed $\Omega = v : r$, with r being the radius of the tire. A tire having a lower than normal inflation pressure will have a smaller radius and will thus rotate at a higher angular velocity. Thus, the radius of the tire may be determined from the velocity of the vehicle and the number of rotations of the tire.

In one system, position signals from a global positioning system (GPS) receiver are used to calculate a distance of the vehicle. From the distant, a desired distance related parameter of a tire having a predetermined inflation pressure may be calculated. The system may then compare the distance related parameter sensed from each tire with the desired distance related parameter to determine whether each tire is properly inflated. If low inflation pressure is detected, a warning system notifies the operator of the vehicle of low pressure.

Normally, a GPS receiver provides a data set of the co-ordinates of the receiver in space every second. However, the exact path between two received data sets of the moving vehicle may not be known and the second distance may be inaccurate, resulting in a false low tire inflation pressure warning. Moreover, output may be unreliable due to GPS reception problems in tunnels, forests, inner cities, as well as sudden multipath situations that can fake 200 m offsets of the actual position, thereby causing false alarms. GPS needs a start up time until the first valid reception of some minutes. Thus, it is an object of the invention to provide a cost effective, accurate system of detecting low tire inflation pressure.

SUMMARY

The invention provides a tire inflation pressure diagnostic system and, in particular, a system for determining whether a tire has lower than desired tire inflation pressure.

The system may compare the vehicle tire's wheel pulses and then may compare the wheel pulse values with distances values calculated from a plurality of navigation sensors. For example, the system may calculate the actual distance d2 that the vehicle has traveled.

The actual distance traveled d2 may be determined using a plurality of position inputs relative to the movement of the vehicle, including, but not limited to, a GPS receiver input, a motion detector input (including input from a compass, gyroscope, and the like and a sensor for detecting movement of the tire (such as detecting wheel pulses)).The input(s) may be contained, such as integrated by a Kalman filter, to determine an absolute position. The absolute positions may be used to determine the wheel distance traveled. For example, the absolute position may be used for map matching to segments in the map database, and to compute the distance by summing the segments matched. As another example, the distance traveled may be calculated by calculating the distances between the absolute positions. For the detection of tire movement or rotation, the system may also include an angular displacement sensor on one, some or all of the tires. Angular rotation sensor may sense the number of rotations of the tire during the distance traveled. The inflation of one, some, or all of the tires may be determined based on the actual distance d2 the vehicle has traveled and the input from the tire movement sensor(s).

Determining a change in the inflation of a tire(s) based on the calculated distance d2 the vehicle has traveled and the input from the tire movement sensor(s) may comprise comparing the actual distance d2 of the vehicle to a first distance d1 which is determined based on the input from the tire movement sensor. The first distance d1 may be calculated by using the input from the tire movement sensor, for example, the number of rotations of the tire, and by assuming proper inflation of the tire (e.g., predetermined radius of tire under proper inflation pressure). In this manner, the first distance d1 may represent the distance the vehicle would travel if the tire were properly inflated. If the actual distance d2 of the vehicle is less than the first distance, the tire may be under-inflated. A method for determining changes in tire inflation pressure in a vehicle tire may thus comprise detecting the number of rotations of the tire to determine a first distance traveled (d1), receiving a plurality of inputs to determine the actual distance traveled d2, integrating the plurality of inputs to arrive at an actual distance traveled, calculating the difference between the first distance d1 and the actual distance traveled d2, determining whether the difference between d1 and d2 exceeds a predefined value, and alerting the operator of the vehicle of the irregular tire pressure.

A change in tire inflation may also be determined by calculating the actual radius of the tire using the actual distance d2 the vehicle has traveled and the input from the tire movement sensor(s). For example, when the tire movement sensor is a tire rotation sensor, the actual radius of the tire may be determined using the equation $d2 = 2\pi r_{act} N$, with d2 equaling the actual distance obtained from the plurality of inputs, and N equaling the input from the tire rotation sensor indicative of the number of tire rotations. Typically, the tire rotation sensor may provide about 20 to about 100 pulses per rotation of the tire depending on the vehicle. Thus, N may be normalized in this equation such that one pulse equals one rotation. The actual radius of the tire may then be compared to the predetermined radius of the tire under proper pressure. The predetermined radius of the tire may be unadjusted or may be adjusted for current operating conditions.

A change in the inflation of a tire(s) may also be determined by calculating the number of rotations of the tire using the actual distance d2 the vehicle has traveled and the input from the tire movement sensor(s). For example, when the tire movement sensor is a tire rotation sensor, the output of the sensor is a number of rotations N1. A number of rotations N2 may be determined using the equation $d2=2\pi r N2$, with d2 equaling the actual distance and r being a predetermined radius. The measured number of rotations N1 may then be compared to a calculated number of rotations N2 to determine whether there has been a change in inflation pressure of the tire. As discussed above, the predetermined radius of the tire may be unadjusted or adjusted for current operating conditions.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

This application relates to tire pressure diagnostic systems for vehicles. In particular, the application relates to a tire pressure diagnostic system for vehicles for determining a change in the inflation pressure of a vehicle tire using wheel rotation signals in combination with a plurality of vehicle position inputs.

Figure 1:
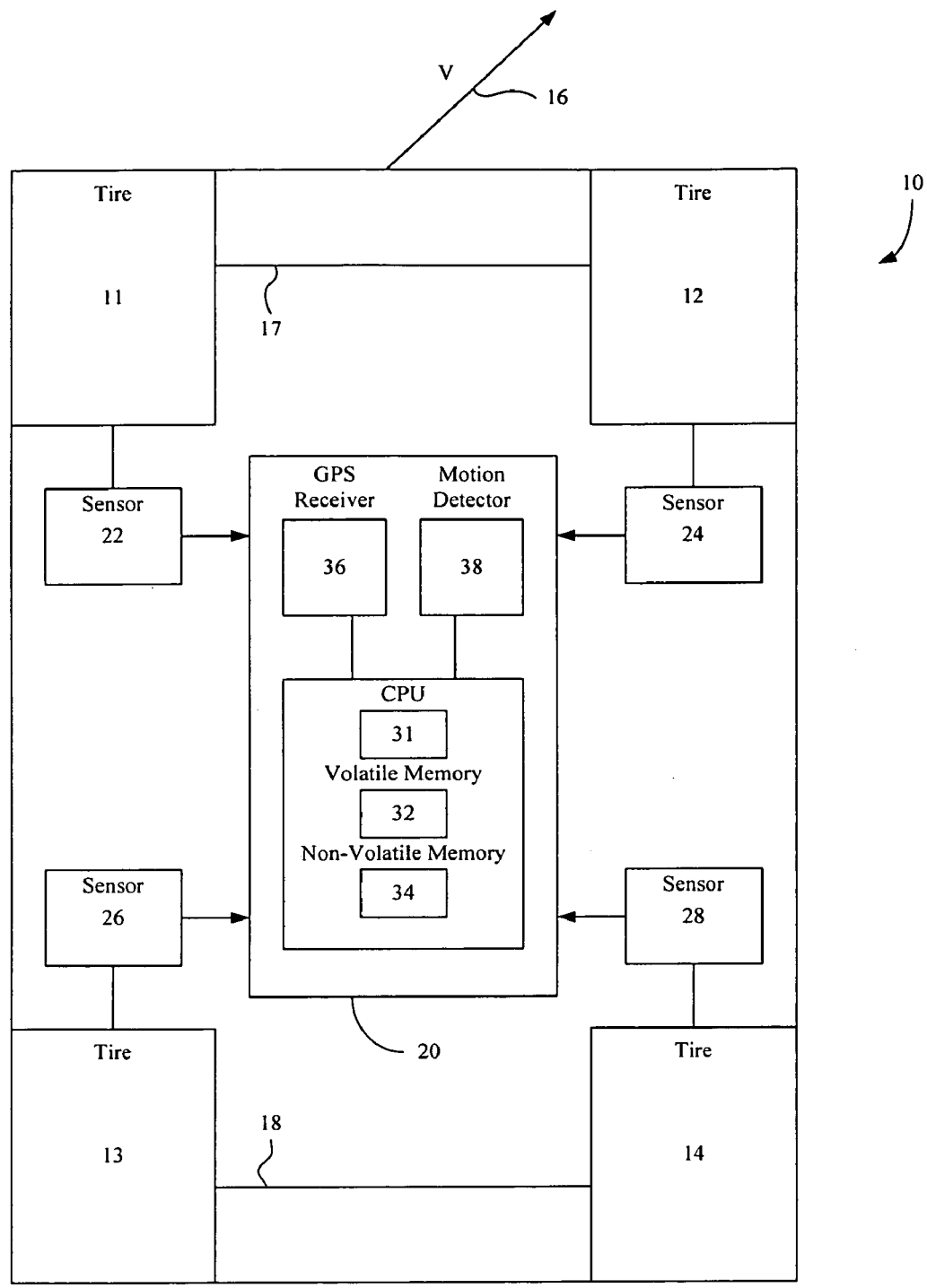
FIG. 1 is schematic representation of a moving vehicle incorporating features of the invention.

FIG. 1 shows a vehicle 10 having four tires 11, 12, 13, 14 and having a system 20 for determining the inflation pressure of the tires. The vehicle 10 is shown as moving at velocity v as indicated by the arrow 16. Tires 11, 12 are those on the front axle 17 of vehicle 10 and tires 13, 14 are those on the back axle 18 of vehicle 10. It should be understood that vehicle 10 may have any number of tires, including fewer or greater numbers of tires, with any number of axles, including fewer or greater numbers of axles. Additionally, it should be understood that the meaning of "vehicle" is not restricted to automobiles or trucks, but may include any mobile apparatus that is provided with an inflated or pneumatic tire. For example, the invention may be useful for detection of tire inflation pressure of tires installed on airplanes, motorcycles, bicycles, mobile industrial equipment and the like.

Each tire, 11, 12, 13, 14 may be provided with a corresponding sensor 22, 24, 26, 28. Sensors 22, 24, 26, 28 may sense movement of a corresponding tire, such as an angular displacement sensor. Such sensors may be included in the vehicle as part of an anti-lock braking system and are known. Each sensor 22, 24, 26, 28 may detect the number of rotations made by its respective tire and input this information into a processor 30. Processor 30 may include a CPU 31, volatile memory 32, such as random access memory (RAM), and a non-volatile memory 34, for example ROM, although other volatile memory and/or non-volatile memory may be used. The processor 30 may use a number of algorithms and methods to process the data it receives including, for example, a Kalman filter which is know in the conventional art. The system 20 may also be provided with a global positioning system (GPS) receiver 36, which may be used to determine the vehicle's position at any given time. Processor 30 may continuously receive data from the GPS receiver, and may execute an algorithm that evaluates the tires' rotation, and may provide a warning signal to the operator of the vehicle if irregular inflation of a tire is detected. System 20 may also comprise a motion detector 38 that may provide additional location/position information.

Figure 2:
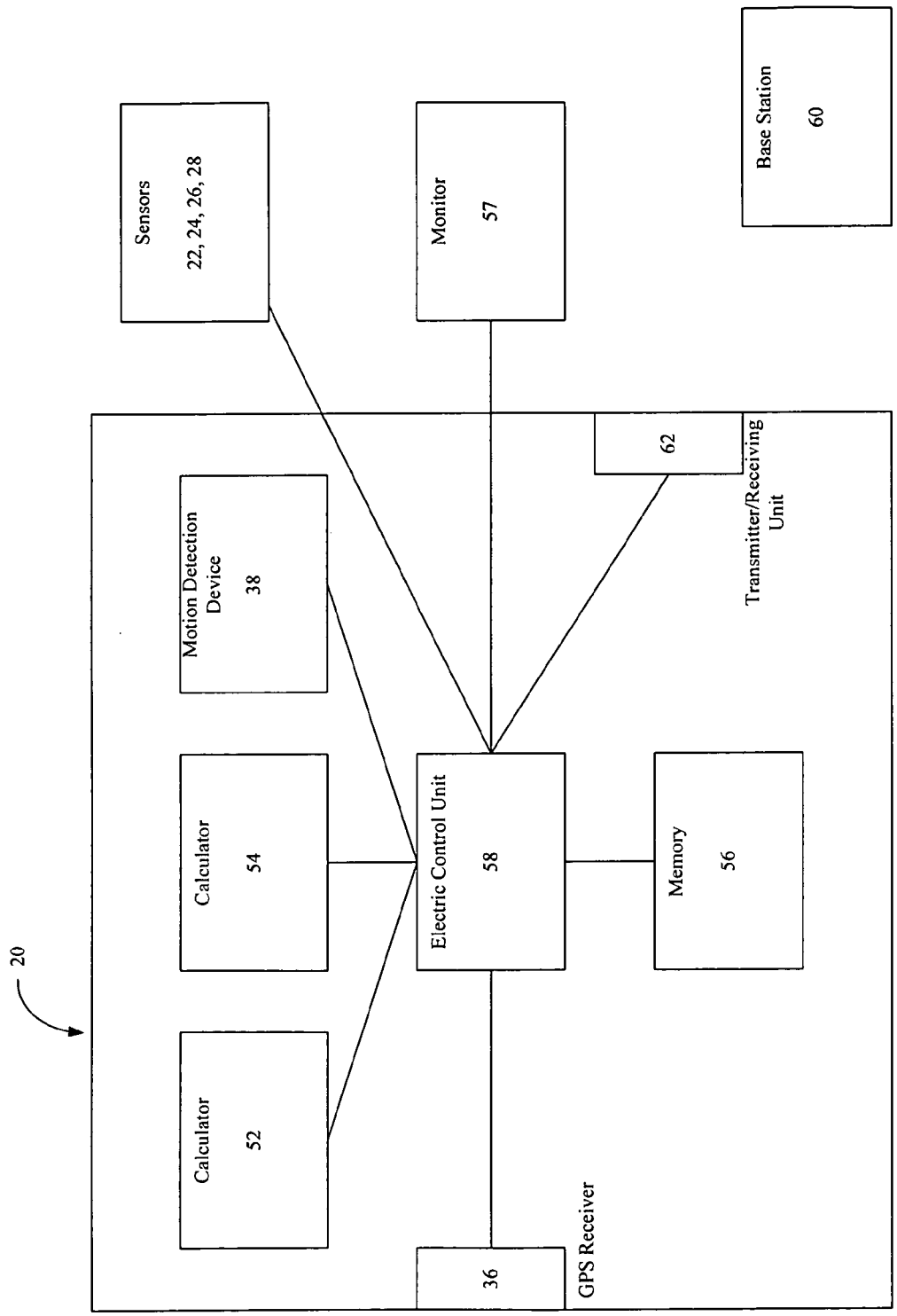
FIG. 2 is a flow chart illustrating a system for determining an irregular tire inflation pressure.

FIG. 2 is a schematic view of system 20, shown in FIG. 1, for determining the inflation pressure of a tire of a moving vehicle. The system 20 may comprise a GPS receiver 36 for receiving GPS signals emitted from GPS satellites in order to determine the actual distance traveled d2 by the vehicle. A GPS receiver installed in a moving vehicle may use a triangular mechanism to calculate its position. The receiver may receive information broadcast from GPS satellites about their positions together with the precise time. With the coordinates of the satellite and the traveled radio signal emitted from the GPS satellites, a GPS receiver in the car may measure the distance to the satellite and may calculate its position from this information.

Normally, the GPS receiver provides a data set of the co-ordinates of the receiver in space every second. However, the absolute accuracy of GPS in the non military standard is not optimal (with the accuracy between 30–50 m) and the reception often is disturbed by multipath situations, for example tall buildings or by shadowing, for example, tunnels and forests. Thus, the exact path between two received data sets of the moving vehicle may not be known. Thus, the exact traveled distance d2 may be calculated by using the GPS data together with additional position inputs. For example, a more accurate actual distance traveled d2 may be obtained by using the GPS data together with one or more additional position inputs. For example, additional position input may be provided by a motion detection device 38 associated with the vehicle and the rotation sensor. The motion detector and/or rotation sensor may be used in combination with the GPS data to more accurately determine the locations of the vehicle along the path of the moving vehicle. Suitable motion detectors include, but are not limited to compasses, gyroscopic devices, steering wheel limit switches, right-left acceleration sensors, and map matching.

An output signal produced from, for example, a gyroscope, indicative of changes in the vehicle course direction (i.e., detected as amounts of turning of the vehicle about a predetermined axis of the gyroscope) may be used, with each such change representing a change in the travel direction of the vehicle in relation to a previously determined absolute travel direction (where, for brevity of description, the term "travel direction" is used herein to refer to an estimated instantaneous direction of travel of a vehicle, derived together with an estimated current position of the vehicle). The direction change information from the gyroscope is used in conjunction with distance information expressing a distance that has been traveled by the vehicle relative to some preceding (absolute) estimated position of the vehicle, i.e., distance information obtained based on an output signal from a vehicle speed sensor to obtain the estimated current position and travel direction of the vehicle. The system may further include a calculator 52, shown in FIG. 2, for calculating the actual traveled distance d2 of the moving vehicle from the GPS signal and the additional input from the motion detector 38.

Using the absolute location of the vehicle at various points along the traveled distance, the traveled distance d2 may be calculated. For example, the absolute location of the vehicle may be used to match the vehicle to a segment in the map database, commonly known as map matching. This may be performed periodically, such as every second, so that the segments in the map database which correspond to the traveled distance may be identified. Since the map database may include a distance for each segment, the distances for the segments which correspond to the traveled distance may be summed to obtain the traveled distance d2. As another example, the absolute locations of the vehicle along the traveled route may be used to calculate the traveled distance directly. Distances between the absolute positions may be calculated, and the distances may be summed to obtain the travel distance d2.

System 20 may also comprise at least one rotation sensor 22 for detecting the number of rotations of the tires. A rotation sensor may be present for each tire of the vehicle. For example, an automobile having four tires may include four rotation sensors. The system 20 may further comprise a calculator 54 which may calculate the actual radius ($r_{act}$) of each tire. Memory 56 may store a predetermined radius r of the tire at proper pressure. Further, memory 56 may also store the calculated radius of the tire ($r_{act}$). When an irregular inflation pressure is detected, the driver of the vehicle may be alerted by a monitor 57, an auditory signal or both. The specific tire or tires which register an irregular tire pressure may also be indicated. Monitor 57 may be connected to the electrical control unit 58 that controls the system 20. The inflation pressure may also be transmitted to a remote base station 60 by way of a transmitter/receiving unit 62. The base station 60, can for example, be the base station of a cellular telephone network, with the transmitter/receiver 62 being, a cellular telephone. The base station 60 may be used, as an inspection station for any kind of vehicle, such as for rented cars of a car rental company. Alternatively, the engine of the vehicle may be stopped, if an irregular inflation pressure of a tire is determined over a certain traveled distance, or the mileage of the vehicle may be tracked, when there is a "no pressure" condition for any one of the tires.

Based on the actual distance traveled d2, as calculated from the GPS signal and the additional input, and the input from the tire sensor(s), the system may determine whether a tire is properly inflated. This determination may be made in several ways.

One way to determine the inflation of the tire(s) based on the calculated distance d2 the vehicle has traveled and the input from the tire movement sensor(s) is by comparing the distance d2 of the vehicle to a first distance d1 which is determined based on the input from the tire movement sensor. The first distance d1 may be calculated by using the input from the tire movement sensor, for example, the number of rotations of the tire, and by assuming proper inflation of the tire (e.g., predetermined radius of tire under proper inflation pressure). A method for determining changes in tire inflation pressure in a vehicle tire is thus provided comprising detecting the number of rotations of the tire over a predetermined period; determining a first distance traveled d1 (by assuming a predetermined radius of time); receiving a plurality of inputs at various times during the predetermined period; for various times, determining absolute positions of the vehicle by integrating the plurality of inputs (such as by using a Kalman filter); determining the distance d2 traveled using the positions; determining whether the difference between d1 and d2 exceeds a predefined value, and alerting the operator of the vehicle of the irregular tire pressure. If the actual distance d2 of the vehicle is less than the first distance d1, the tire may be underinflated. "Kalman filter" is used in its conventional sense. It refers to a software program for filtering out noise or errors in data. A GPS Kalman filter may be used to filter out noise or errors in the GPS processing system in order to enhance the accuracy of position estimates.

The predetermined radius of the tire may be unadjusted or adjusted for current operating conditions. For example, the predetermined radius may be a constant number which is stored in a memory unit of the system which indicates the radius of the tire under proper pressure or may be a previously calculated radius for the tire. Or, the predetermined radius of the tire may be determined by using a radius of the tire (either a constant number or a previously calculated radius) adjusted based on current operation of the vehicle, for example the radius of the tire may depend on heat, rotational speed of the tire, and other operational factors. These factors may be used to modify a value of the radius of the tire under proper inflation pressure (such as a predetermined constant value) to account for current operating conditions.

For example, from the last time the vehicle traveled, the expected radius of the tire may be the predetermined (expected) r for the present trip. As the vehicle moves, the actual radii of the tires may be determined. If from the start the output from all four tires is different from the expected value, the difference may be due to situations such as a heavy load in the car or the cold temperature of the tires. Thus, the new value is accepted as the predetermined (or expected) value. If all of the radii of the tires slowly change in the same way, this is likely due to a temperature increase from normal operating conditions. If two tire values on one side of the vehicle deviate to higher values than the values on the other side, this may be attributable to the fact that the car may be turning, which may be counterchecked with other navigation inputs. If one actual value slowly or suddenly deviates from the expected value, then an inflation pressure issue may be present.

Figure 3:
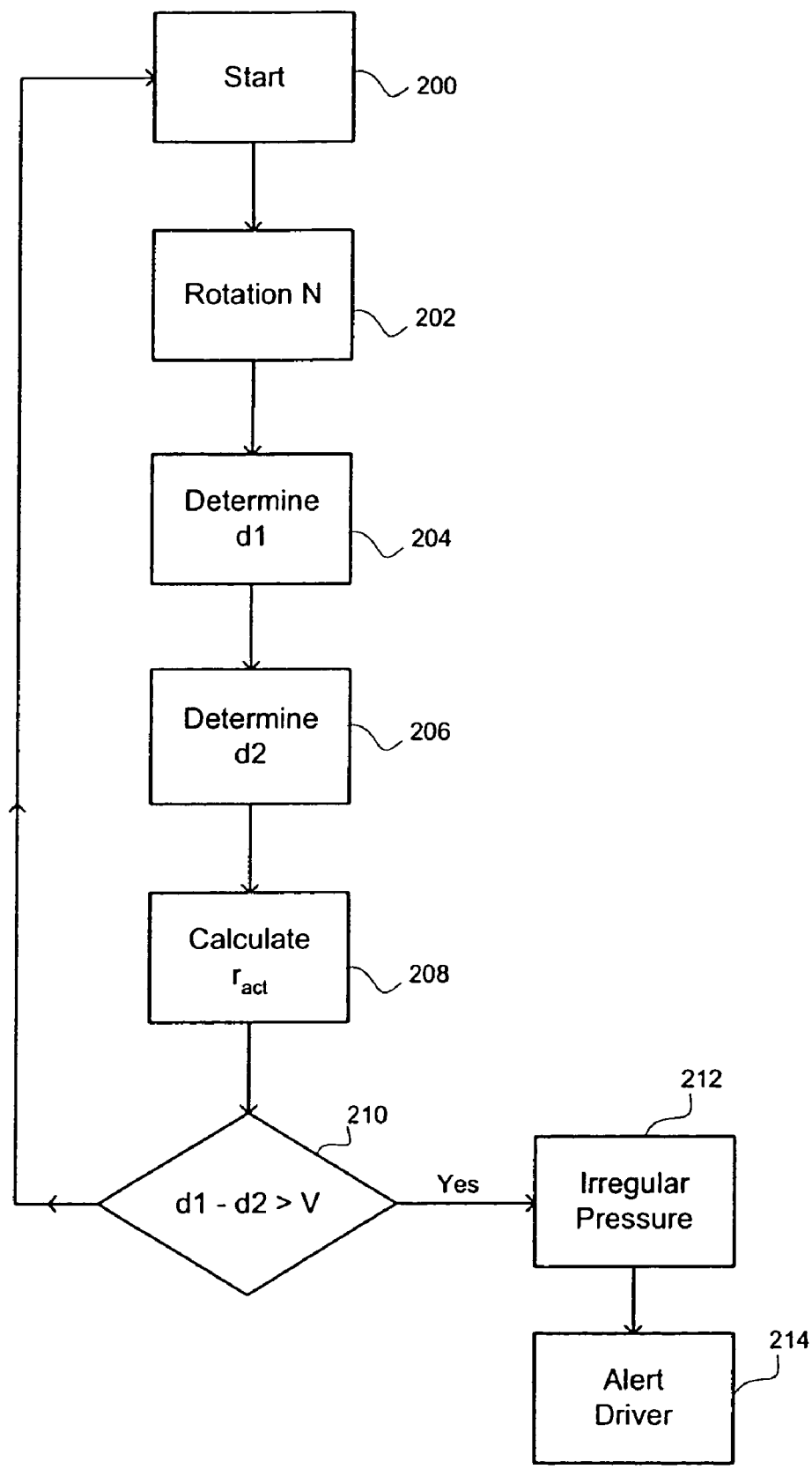
FIG. 3 is a schematic view of a system for determining tire inflation pressure.

As shown in FIG. 3, a method for determining a change of a tire inflation pressure in a tire inflation diagnostic system is provided. As the vehicle starts moving (as shown at step 200), sensors associated with each tire of the vehicle may sense the actual number of rotations (N) of the tire (as shown at step 202). A first distance traveled d1 may be determined (204) based on the actual sensed number of tire rotations and based on the last values of the radii of the tires from a previous calculation. The first traveled distance d1 may be determined by detecting the number of rotations N of the tire of the vehicle by means of the sensor corresponding with the tire, according to following equation:

$$d1 = 2\pi r N,$$

where r is a predetermined value of the radius of the tire under proper tire pressure.

A second distance traveled d2 is determined (206). As discussed above, the second distance traveled d2 may correspond to the actual travel distance of the vehicle as calculated on the basis of a plurality of inputs which may be integrated by, for example, a Kalman filter. For example, the actual travel distance d2 may be based on inputs such as GPS receiver inputs, motion detector inputs, and wheel pulses.

The actual distance traveled d2 by the vehicle may be determined based, at least in part, on a map matching algorithm. The map matching algorithm may be used to determine the map segment in a map database in which the vehicle currently is traveling. For example, if it is known which segment on the map the vehicle currently resides, input from a sensor, such as the motion detector, indicating the direction of the vehicle may be used to determine which map segments the vehicle subsequently travels on. Further, a history of the map segments traveled by the vehicle may be recorded. In this manner, the distance traveled by the vehicle may be calculated for a predetermined time period by determining the map segments traveled during the predetermined time period and summing the distances of the determined map segments. Thus, by using the GPS data and the additional input, it may be possible to precisely calculate the actual traveled distance d2 from absolute position outputs provided by a Kalman filter.

As shown in FIG. 3, distances d1 and d2 may then be compared (as shown at step 210). An irregular inflation pressure may be detected if the difference between the first traveled distance d1 and the second traveled distance d2 is larger than a predetermined threshold value V, e.g., d1 being much larger than the distance d2. In case of a low pressure tire, this tire rotates faster than the other tires so that the calculated distance d1 using a higher predetermined value r of the tire is higher than in reality. As shown at step 208, the actual radius of the tire may be determined at some point after start and that value may be used as r.

The determination of a change in tire inflation may also be made by calculating the actual radius of the tire, using the actual distance d2 the vehicle has traveled, and the input from the tire movement sensor(s). For example, when the tire movement sensor is a tire rotation sensor, the actual radius $r_{act}$ depends directly on the inflation pressure of the tire, so that the inflation pressure of the tire can be deduced from the radius of the tire. The actual radius of the tire may be determined by the following equation:

$$d2 = 2\pi\, r_{act}\, N$$

with d2 equaling the actual distance obtained from the plurality of inputs, and N equaling the input from the tire rotation sensor indicative of the number of tire rotations. Typically, the tire rotation sensor may output about 20 to about 100 pulses per rotation of the tire, depending on the vehicle. N may be normalized in this equation such that one pulse equates with one rotation. The actual radius of the tire may then be compared to the predetermined radius of the tire under proper pressure. As discussed above, the predetermined radius of the tire may be unadjusted or adjusted for current operating conditions. If the actual radius of the tire differs from the predetermined radius by a specified value, a change in the inflation pressure may be detected and the operator of the vehicle may be alerted.

However, the radius of the tire may be affected not only by the inflation pressure, but also by rotational forces at high velocities and heat. For example, the circumference of the tire may increase with higher velocities because the centrifugal force increases with higher angular velocities. This increase may be as high as 5 cm for a car traveling at a velocity of more than 200 km/h. Because the distance d1 is determined by using a predetermined value of the radius r of the tire, it may be required to adapt this predetermined value r to the actual driving conditions of the vehicle. Therefore, the distance d1 at $Time_T$ may be calculated by using the actual radius of the tire $r_{act}$ at $Time_{T-1}$ as the predetermined value of radius r. For example, if determining the radius r is repeated every 1 to 10 seconds, the radius detected 1 to 10 seconds earlier, can be used as the radius r to determine d1. Thus, a changing radius of the tire due to rotational forces at high velocities or heat is taken into account when the distance d1 based on the number of rotations is calculated, and misinterpretation of a changing tire radius caused by high velocities as an irregular inflation pressure is prevented or highly reduced. Further, an irregular inflation pressure is detected only if an actual puncture or slow leak of the tire is present.

The actual value $r_{act}$ also may be calculated for all tires of the vehicle and the results may be compared to each other. If a calculated radius $r_{act}$ of one tire differs from another calculated radius by a predetermined amount, a low pressure situation may be present. For example, where only one radius of the calculated radii for all tires differs from the others, a low pressure condition is likely present. The calculated radii $r_{act}$ may also be compared for one axle of the vehicle. If they differ by a predetermined amount, a low pressure condition may be probably present.

An average actual radius $r_{actAV}$ may also be calculated for each tire, taking into account the last M calculations of $r_{act}$, M varying, e.g., between 10 and 100. In this instance, the average radius values $r_{act}$ of each tire of one axle of the vehicle may be compared and an irregular inflation pressure recognized. Using the average radius of multiple measurements, the reliability of the system may be increased since single erroneous calculated values have less influence on the determination of an irregular inflation pressure.

Figure 4:
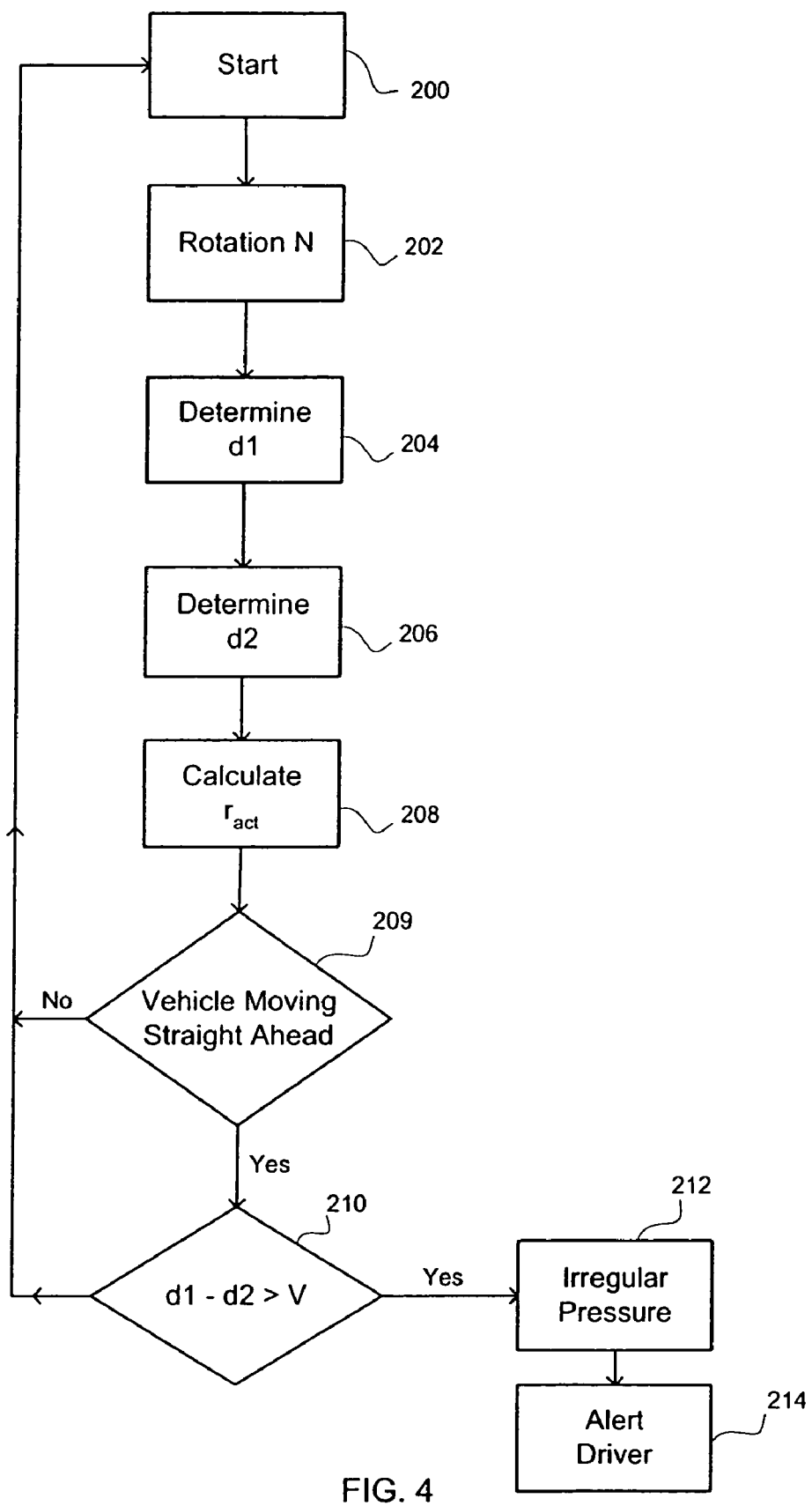
FIG. 4 is a flow chart illustrating a system for determining an irregular tire inflation pressure.

FIG. 4 is a flow chart further illustrating a method of determining tire inflation pressure. As a vehicle starts moving (step 200), the number of rotations N of each tire may be detected (step 202) by a rotation detector. After obtaining the number of rotations N for a time period (such as a predetermined time period), the distance the tire has traveled d1 may be determined according to the following equation:

$$d1 = 2\pi r N \text{(step 204)},$$

r being a predetermined value. Further, the actual traveled distance d2 may be determined (Step 206). From the actual traveled distance d2 and the number of rotations N, the actual radius $r_{act}$ may be determined according to the following equation:

$$d1 = 2\pi r_{act} N \text{(step 208)}.$$

Actual traveled distance d2 may be more accurately determined by determining d2 from the GPS signal in combination with an additional motion detecting device or method for determining a distance traveled. For example, as shown in FIG. 4, whether the vehicle is going straight ahead or whether the vehicle is turning (step 209) may be taken into account because each tire follows a different radius r when the vehicle turns around a bend. Thus, the different radius values r of each tire may be considered. If the vehicle turns to the right, for example as indicated by arrow 16 in FIG. 1, then the right rear tire 14 will be on the innermost circle, the right front tire 12 will be on the next to innermost circle, the left rear tire 13 will be on the next outermost circle and the left front tire 11 will be on the outermost circle. By knowing the direction in which the vehicle is turning by means of a motion detecting device, accurate inflation pressures may be determined in those instances when the vehicle is not driving straight.

The distance d1 based on the number of rotations may be compared to the distance d2 (step 210). If the difference between these d1 and d2 values is larger than a threshold value V, an irregular inflation pressure is detected (step 212) and the operator of the vehicle may be alerted (step 214). If the difference is within the predetermined value V, the detection process restarts.

Alternatively, it may be desirable to account for the presence of a positive or negative acceleration. In case of a large negative acceleration, i.e., when the driver is braking, the tires of the vehicle may slip, resulting in inaccurate results for determining d1. In this case, step 209 of FIG. 4 may be related to calculating the acceleration of the vehicle. In the event of high acceleration of the vehicle, the analysis of tire pressure may be bypassed or ignored. If no low pressure condition is detected, the process resumes. In this situation, d1 is determined by using the actual r value determined at step 208.

When the method is performed for the first time after starting the engine of the vehicle, step 208 (the calculation of $r_{act}$) may be carried out at the beginning, if the number of rotations N and the actual traveled distance d2 are known. This first calculated value of $r_{act}$ may be designated as the predetermined radius r for subsequent calculations of d1.

Additionally, the number of revolutions N of all tires of the vehicle may be compared, and a tire having a number of revolutions differing from the other tires by a predetermined amount may not used for determining the inflation pressure. In this manner, a slipping of one tire, when the vehicle travels on dirt, sand or snow, and one tire spins more frequently over the traveled distance than the others, can be recognized. Thus, a slipping tire will not generate a false warning of irregular inflation pressure.

Figure 5:
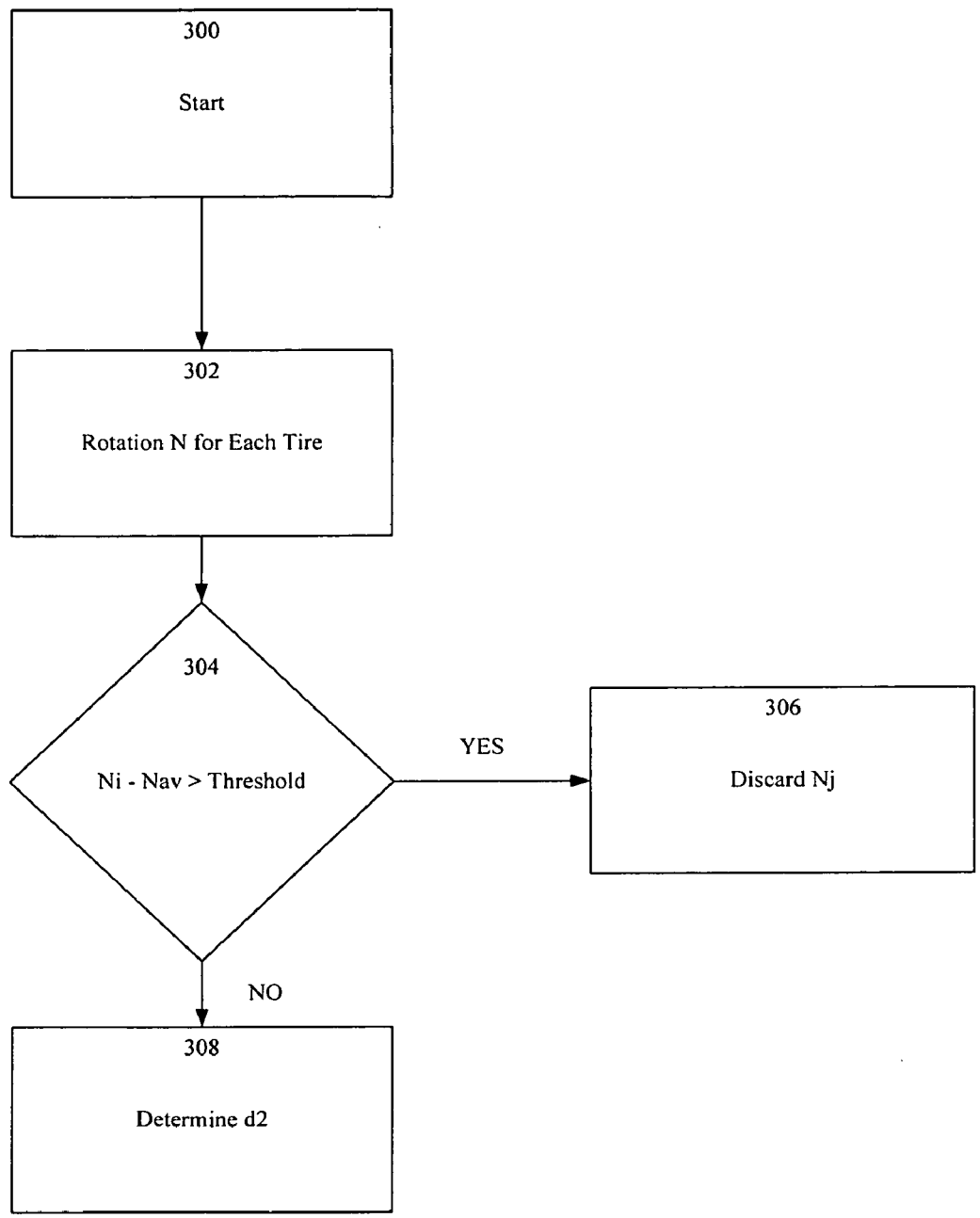
FIG. 5 is a flow chart illustrating a system for determining an irregular tire inflation pressure.

The method of FIG. 5 may be used to determine whether one wheel is slipping or not. After the vehicle begins moving (300), the number of rotations may be determined for all wheels of the vehicle (302). The average number of rotations $N_{av}$ may be calculated and then it may determined whether the number of rotations $N_i$ for one wheel differs from the average number $N_{av}$ by a predetermined amount (304). If this is the case, the value of the tire showing this condition, may be discarded (306). If all values n are within a certain range, then the distance d2 may be determined (308). The method of FIG. 5 may be carried out for one axle of the vehicle, so that the slipping wheel of one axle may be determined and discarded from the determination of the inflation pressure.

Figure 6:
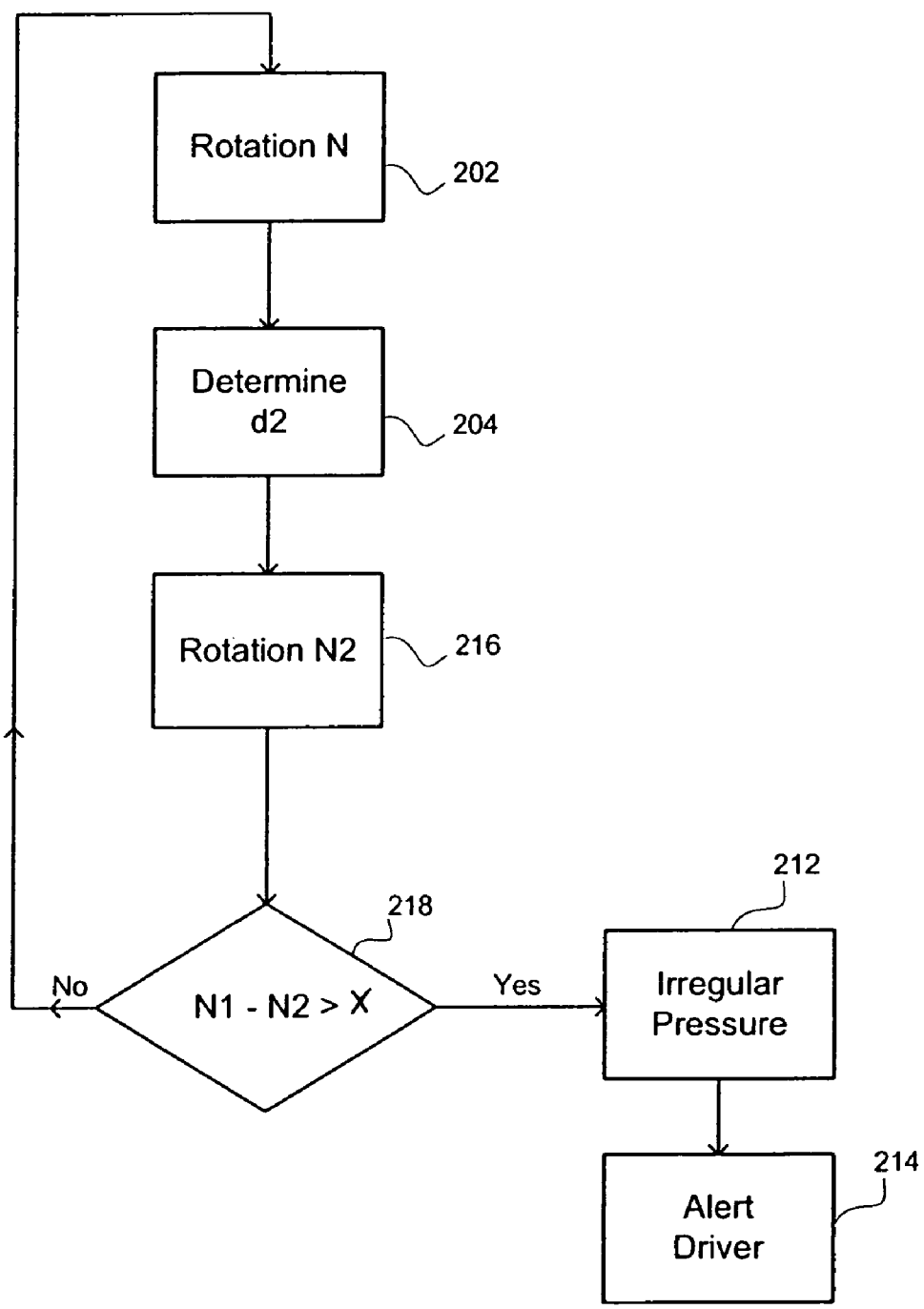
FIG. 6 is a flow chart illustrating a system for determining an irregular tire inflation pressure.

Still another way to determine the inflation of the tire(s) is by calculating the number of rotations of the tire using the actual distance d2 the vehicle has traveled and the input from the tire movement sensor(s). For example, when the tire movement sensor is a tire rotation sensor, the output of the sensor is the measured number of rotations N1. A calculated number of rotations N2 may be determined. The measured number of rotations N1 may then be compared to a calculated number of rotations N2 to determine whether there has been a change in inflation pressure of the tire. As shown in FIG. 6, a change of a tire inflation of a vehicle may be determined using number of rotations N of the tires as a basis. In this case, the number of rotations N1 may be detected by using the rotation sensor or detector (202). Using the actual traveled distance d2 obtained from the GPS signal (206) and/or additional input from a motion detector, the calculated number of rotations N2 may be determined according to the following equation (216):

$$d2=2\pi rN2,$$

with r being a predetermined value of the radius.

N1 and N2 may then be compared (218), and an irregular inflation pressure may be present, if the difference between the measured value N1 and the calculated value N2 is larger than a predetermined threshold value X. If the difference is larger than X, an irregular inflation pressure is detected (212) and the driver may be alerted (214). If the difference is smaller than the predetermined value X, the whole method can be started again.

While various aspects of the invention have been described, it will be apparent to those of ordinary skill in the art that many more aspects and implementations are possible within the scope of the invention. Accordingly, the invention is not to be restricted except in light of the attached claims and their equivalents.

What is claimed is:

1. A tire pressure diagnostic method for at least one tire in a moving vehicle, comprising:
   determining a first traveled distance d1 based on output from at least one tire movement sensor and a predetermined value of a radius of the tire;
   receiving a plurality of navigational inputs;
   determining a second traveled distance d2 from the plurality of navigational inputs; and
   comparing d1 and d2 to diagnose the tire pressure.

2. The tire pressure diagnostic method of claim 1 where the output from the tire movement sensor comprises data indicative of the number N of tire rotations.

3. The tire pressure diagnostic method of claim 1 where the output from the tire movement sensor comprises data indicative of wheel pulses sensed from the tire.

4. The tire pressure diagnostic method of claim 1 where comparing d1 and d2 comprises:
   calculating a difference between d1 and d2; and
   determining whether the difference between d1 and d2 exceeds a predetermined value.

5. The tire pressure diagnostic method of claim 1 where determining the first distance traveled d1 is according to the following equation:
   d1=2.pi.rN, where r is the predetermined value of the radius of the tire and N a number of rotations of the tire.

6. The method of claim 1 where determining the second distance traveled d2 comprises:
   detecting a GPS signal of the vehicle;
   receiving additional input relating to the position or movement of the vehicle;
   integrating the GPS signal with the additional input; and
   obtaining an absolute position of the vehicle.

7. The method of claim 6 where the additional input is provided by a motion detector.

8. The method of claim 7 where the motion detector includes a compass, a gyroscopic device, a steering wheel limit switch, right-left acceleration sensors, map matching or any combination thereof.

9. The method according to claim 1, comprising calculating the radius $r_{act}$ of the tire from the second traveled distance d2 and the number of tire rotations N.

10. The method of claim 9 where the radius $r_{act}$ is determined according to the following equation:

$$d2 = 2 \cdot pi \cdot r_{act} \cdot N.$$

11. The method of claim 10 where $r_{act}$ is determined at regular intervals from between about 1 to about 10 seconds.

12. The method of claim 9 where $r_{act}$ is the predetermined value for the radius of the tire for the calculation of d1.

13. The method of claim 1 comprising obtaining output from tire movement sensors for each tire of the vehicle.

14. A tire pressure diagnostic method for at least one tire in a moving vehicle, comprising:
  detecting a value indicative of a number of rotations N of the tire;
  receiving a plurality of inputs relative to the position or movement of the vehicle;
  integrating the plurality of inputs;
  determining an actual traveled distance d2 from the plurality of inputs;
  determining an actual radius $r_{act}$ of the tire from the actual traveled distance d2 and the number of tire rotations N; and
  comparing the actual radius $r_{act}$ to a predetermined radius.

15. The method of claim 14 where the actual radius is determined from the following equation:

$$d2 = 2 \cdot pi \cdot r_{act} \cdot N.$$

16. The method of claim 14 where receiving the plurality of inputs comprises detecting a GPS signal of a moving vehicle, and receiving additional input relating to the position or movement of the vehicle.

17. The method according to claim 16 where the additional input is provided by a motion detector.

18. The method according to claim 17 where the motion detector is a compass, a gyroscopic device, a steering wheel limit switch, right-left acceleration sensors, map matching or any combination thereof.

19. The method according to claim 14, where $r_{act}$ is determined at regular intervals from between about 1 to about 10 seconds.

20. A tire pressure diagnostic method for at least one tire in a moving vehicle, comprising:
  detecting a value indicative of a number N1 of rotations of the tire;
  receiving a plurality of inputs relating to the position or movement of the vehicle;
  integrating the plurality of inputs;
  determining an actual traveled distance d2 from the plurality of inputs;
  calculating a number of rotations N2 of the tire from the actual traveled distance d2; and
  comparing the number of rotations N1 with the calculated number of rotations N2 to diagnose tire pressure.

21. The method of claim 20 where comparing N1 and N2 comprises determining whether the difference between N1 and N2 exceeds a predetermined value.

22. The method of claim 20 where calculating the number of rotations N2 is according to the equation:
  $d2 = 2 \cdot pi \cdot r N2$, where r is a predetermined value of the radius of the tire and N2 is the number of rotations of the tire.

23. The method of claim 22 where receiving the plurality of inputs comprises detecting a GPS signal of a moving vehicle, and receiving additional input relating to the position or movement of the vehicle.

24. The method of claim 23 where the additional input is provided by a motion detector.

25. The method according to claim 24 where the motion detector is a compass, a gyroscopic device, a steering wheel limit switch, right-left acceleration sensors, map matching or any combination thereof.

26. A tire diagnostic system for determining a change of inflation pressure in a tire in a moving vehicle having at least one tire, comprising:
  a sensor cooperating with each tire for sensing a value indicative of the number N of rotations of the tire;
  a calculating unit for determining a first traveled distance d1 of the vehicle;
  a global positioning receiver for receiving a global positioning signal;
  at least one motion detector for receiving additional navigational input;
  an integrating unit for integrating inputs received from the global positioning receiver and the at least one motion detector;
  a calculating unit for determining an actual distance traveled; and
  a warning device, where the system compares d1 with the actual distance traveled to diagnose the inflation pressure and the warning device alerts a driver of any irregular inflation pressure.

27. The system of claim 26 where the integrating unit comprises a Kalman filter.

28. The system of claim 26 where the motion detector comprises a compass, gyroscopic device, steering wheel limit switch, right-left acceleration sensors, map matching or any combination thereof.

29. The system of claim 26 where the additional input comprises vehicle position or movement.

30. The system of claim 26 where the additional navigational input comprises tire position or movement.

31. A tire pressure diagnostic system for a vehicle comprising:
  logic for receiving a plurality of navigational inputs;
  logic for determining a traveled distance of the vehicle based on the plurality of navigational inputs;
  logic for receiving input indicative of tire movement; and
  logic for diagnosing tire pressure for at least one of the tires based on the traveled distance of the vehicle and the input indicative of the tire movement.

32. The tire pressure diagnostic system of claim 31, where the plurality of navigational inputs comprises a GPS input and a motion detector input.

33. The tire pressure diagnostic system of claim 31, where the traveled distance of the vehicle is a second traveled distance d2; and
  where the logic for diagnosing tire pressure for at least one of the tires comprises:
  logic for determining a first traveled distance d1 based on output from at least one tire movement sensor and a predetermined value of a radius of the tire; and
  logic for comparing d1 and d2 to diagnose the tire's inflation.

34. The tire pressure diagnostic system of claim 31, where the traveled distance of the vehicle is an actual traveled distance d2;

where the input indicative of tire movement comprises a value indicative of a number of rotations N of the tire; and where the logic for diagnosing tire pressure for at least one of the tires comprises:

determining an actual radius $r_{act}$ of the tire from the actual traveled distance d2 and the number of tire rotations N; and comparing the actual radius $r_{act}$ to a predetermined radius.

35. The tire pressure diagnostic system of claim 31, where the traveled distance of the vehicle is an actual traveled distance d2;

where the input indicative of tire movement comprises a value indicative of a number of rotations N1 of the tire; and where the logic for diagnosing tire pressure for at least one of the tires comprises:

calculating a number of rotations N2 of the tire from the actual traveled distance d2; and comparing the number of rotations N1 with the calculated number of rotations N2 to diagnose tire pressure.

36. A tire pressure diagnostic system for a vehicle comprising:

logic for receiving input from a motion detector for positions of the vehicle along a path of travel;

logic for matching the positions of the vehicle to segments in a map database based on the input from the motion detector;

logic for determining a traveled distance value corresponding to the path of travel of the vehicle based on the segments matched to the positions of the vehicle;

logic for receiving input indicative of tire movement of at least one tire; and logic for diagnosing tire pressure for the at least one tire based on the traveled distance value and the input indicative of the tire movement.

* * * * *

UNITED STATES PATENT AND TRADEMARK OFFICE
CERTIFICATE OF CORRECTION

| | | |
|---|---|---|
| PATENT NO. | : 7,187,273 B2 | Page 1 of 1 |
| APPLICATION NO. | : 10/841078 | |
| DATED | : March 6, 2007 | |
| INVENTOR(S) | : Michael Rieck et al. | |

It is certified that error appears in the above-identified patent and that said Letters Patent is hereby corrected as shown below:

On the Title Page

In column 1, line 1 under "Foreign Application Priority Data", delete "03009787" and substitute --03009787.7-- in its place.

Signed and Sealed this

Twenty-sixth Day of June, 2007

JON W. DUDAS
*Director of the United States Patent and Trademark Office*